C. W. HARRISON.
VALVE OF INTERNAL COMBUSTION ENGINES.
APPLICATION FILED OCT. 9, 1912.
1,214,544.  Patented Feb. 6, 1917.
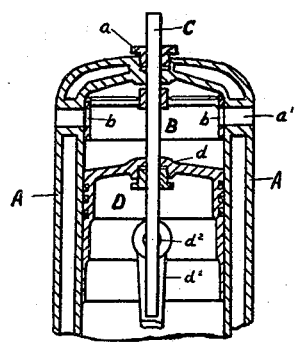
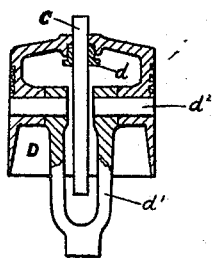
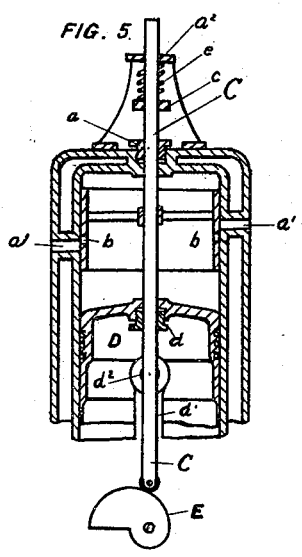
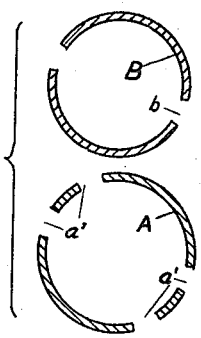
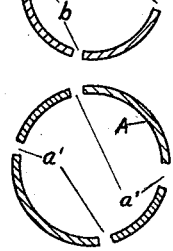
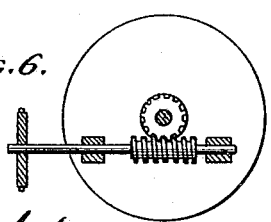
WITNESSES:  INVENTOR

UNITED STATES PATENT OFFICE.

CLARK WAY HARRISON, OF SUMMIT, NEW JERSEY.

VALVE OF INTERNAL-COMBUSTION ENGINES.

1,214,544.  Specification of Letters Patent.  Patented Feb. 6, 1917.

Application filed October 9, 1912. Serial No. 724,820.

*To all whom it may concern:*

Be it known that I, CLARK WAY HARRISON, a citizen of the United States, and a resident of the town of Summit and State of New Jersey, have invented certain new and useful Improvements in Valves of Internal-Combustion Engines, of which the following is a specification, reference being made to the accompanying drawings, forming a part thereof.

This invention relates to valves for internal combustion engines of the kind in which the admission and exhaust of the working fluid are controlled by an internal valve arranged to slide or turn within the cylinder, and provides improvements in the balancing and the construction of such valves.

In my improved construction the valve, which may be either rotary or reciprocating, is actuated by a central shaft which extends through both the end of the cylinder and the piston so as to balance the end pressures. The shaft may be hollow to provide for the circulation of cooling fluid.

In order that the said invention may be clearly understood and readily carried into effect I will describe the same more fully with reference to the accompanying drawings, the invention being more particularly pointed out in the claims.

In the said drawings Figure 1 is a longitudinal section of an engine cylinder provided with a rotating cylindrical valve according to my invention. Fig. 2 is a section of the piston taken at right angles to Fig. 1. Figs. 3 and 4 are diagrammatic views showing two different arrangements of ports in the said valve and cylinder, and Fig. 5 shows in section a cylinder provided with a sliding valve actuated by my improved means. Fig. 6 shows in section one form of driving means for the rotating cylindrical valve, see Fig. 1.

A is the cylinder, B the cylindrical valve, C the valve operating rod or shaft and D is the piston.

In Fig. 1 the cylindrical valve B is arranged to rotate and is placed close to the upper end of the cylinder, the operating shaft C passing in one direction through a gland $a$ in the cylinder end and in the other direction through a gland $d$ in the piston, both ends of the shaft being thus removed from the pressure in the cylinder so that no unbalanced end pressures are set up, as would be the case if the shaft were not extended through the piston. The shaft is rotated by any suitable gearing (not shown) connected to it at its upper end and the rotation may be continuous or oscillatory. The shaft may if desired be made hollow and provided with water or air circulation for cooling purposes. The cylinder is provided with inlet and exhaust ports $a^1$ placed opposite to each other. The valve has corresponding ports $b$ registering with the ports $a^1$ at the required points of the piston travel. To permit the shaft C to pass through the piston the piston rod $d^1$ may be forked as shown in Fig. 2 and the forked ends mounted upon the divided pin $d^2$, between the ends of which a gap is left for the shaft. Or two parallel piston rods may be used. The precise arrangement of the ports in the cylinder and valve is immaterial so long as the valve ports are equal and oppositely placed so as to obtain lateral balancing, or if there be an odd number of ports in the valve, so long as they are of equal area and equidistant.

In the diagrammatic view, Fig. 3, the cylinder A is shown with two pairs of ports $a^1$, each pair consisting of two opposite and equal ports, one pair serving for inlet and the other for exhaust. The valve B has two ports $b$ placed opposite each other and successively uncovering each pair of cylinder ports as the valve rotates. In this arrangement the valve is designed to make one revolution to four revolutions of the crank shaft. I may, however, as shown in Fig. 4, provide the valve B with four ports and alter the position of the two pairs of cylinder ports in such a manner that by rotation of the valve the two pairs of cylinder ports are uncovered alternately, at the required intervals, four times during each revolution. In this case the valve may make only one revolution for eight revolutions of the crank shaft. The valve may be designed to revolve in a recess in the cylinder and may be connected loosely with the operating shaft so as to allow for expansion and contraction. Instead of ordinary packing for glands $a$ and $d$ I may preferably use around the operating shaft, one or more packing rings held in position by washers and nut.

In Fig. 5 the cylindrical valve is a reciprocating one and is operated by a single suitably shaped cam E driven at the required speed (one revolution for every two revolutions of the crank shaft in the arrangement shown) by any suitable gearing and acting upon the central shaft C at the lower end. At the opposite end of the shaft is a spring $e$ bearing against a bracket $a^2$ or other fixed support on the end of the cylinder and against a collar $c$ on the shaft so that the latter is kept close up to the cam E.

To clear the piston rod I may use two similar cams acting on a cross piece on the shaft C, or the positions of the cam E and spring $e$ may be reversed so that the cam E is at the upper end of the shaft, or both spring and cam may be arranged at the same end, the arrangement shown being intended merely as a diagram illustrating the method of operation. In the valve the ports $b$ are opposite each other and as the cylinder inlet port on one side must not be uncovered while the exhaust port is open, one is placed at a higher level than the other as shown. With the form of cam shown and in a four stroke cycle engine such as is illustrated as an example, when the shaft is on the part of the cam nearest to the center (extending over about a semi-circle) both ports are closed and during half a revolution of the cam the compression and working strokes of the piston take place. During the next quarter revolution the exhaust port at the left hand side of the drawing is opened and when the exhaust stroke of the piston is completed this port is closed and the opposite inlet port opened, this occurring during the fourth quarter of the revolution. At the end of the suction stroke the outer point of the cam is passed and the spring $e$ returns the valve instantly to its first position, in which both ports are closed ready for the ignition of the charge. With this arrangement all the movements of the valve necessary to control the admission and exhaust are obtained without any complicated gearing. The valves and operating means are applicable equally to either two or four stroke engines and require no auxiliary valves such as have sometimes been used in connection with an inner cylindrical valve.

It is obvious that various other forms and modifications may be made without departing from the spirit and scope of my invention.

I claim as my invention:

1. In an internal combustion engine, the combination of a cylinder, a piston, a valve within the cylinder, and a longitudinal valve operating shaft having one end extended through the piston into atmospheric pressure and the other end extended through the cylinder head into atmospheric pressure.

2. In an internal combustion engine, the combination of a cylinder, a piston, a valve within the cylinder and a hollow longitudinal valve operating shaft having one end extended through the piston into atmospheric pressure and the other end extended through the cylinder head into atmospheric pressure.

3. In an internal combustion engine, the combination of a cylinder, a piston, a rotary cylindrical valve within the cylinder, and a longitudinal valve operating shaft extending through the center of the piston and through the cylinder head.

4. In an internal combustion engine, the combination of a cylinder, a piston, a rotary cylindrical valve within the cylinder, and a longitudinal valve operating shaft extending through the center of the piston and through the cylinder head and adapted to balance the longitudinal pressures on said valve and shaft.

This specification signed and witnessed this 7th day of October 1912.

CLARK WAY HARRISON.

Signed in the presence of—
 LILLIE VREELAND,
 HENRY S. HILL.